United States Patent [19] [11] 4,330,824
Girard [45] May 18, 1982

[54] UNIVERSAL ARRANGEMENT FOR THE EXCHANGE OF DATA BETWEEN THE MEMORIES AND THE PROCESSING DEVICES OF A COMPUTER

[75] Inventor: Paul M. Girard, Versailles, France

[73] Assignee: Compagnie Internationale pour l'Informatique Cii Honeywell Bull (Societe Anonyme), Paris, France

[21] Appl. No.: 64,791

[22] Filed: Aug. 8, 1979

[30] Foreign Application Priority Data

Aug. 17, 1978 [FR] France ............................... 78 23954

[51] Int. Cl.³ .............................................. G06F 3/06
[52] U.S. Cl. ................................................. 364/200
[58] Field of Search ... 364/200 MS File, 900 MS File

[56] References Cited
U.S. PATENT DOCUMENTS 3,237,169  2/1966  Hartwig et al. ..................... 364/900
3,818,459  6/1974  Vrablik .............................. 364/200
4,099,231  7/1978  Kotok et al. ....................... 364/200

Primary Examiner—Gareth D. Shaw
Assistant Examiner—Thomas M. Heckler
Attorney, Agent, or Firm—Edward J. Kondracki

[57] ABSTRACT

An interface for the exchange of data between memories and processing devices of a computer, which interface does not depend on any particular technology of the processing and memory units and which is readily adaptable to units having different timing for the signals exchanged. The interface employs asynchronous dialog signals, with adjustable timing provided by delay devices such as delay lines. The initiation of a memory cycle involves two asynchronous signals: a memory cycle request signal output by a portion of the interface included within the processing unit, and a cycle acknowledge signal output by a portion of the interface included within the memory unit and transmitted back to the processing unit to indicate that the requested memory cycle has in fact started. Another pair of asynchronous dialog signals are involved in a memory reading operation: a data ready signal output by the portion of the interface included within the memory unit, and a reading finished signal output by the portion of the interface included within the processing unit to indicate that the processing unit is finished with the data. A similar pair of asynchronous dialog signals are involved in a memory writing operation: a write initiate signal output by the processor, and a writing finished signal returned by the memory unit. Similar interface arrangements may be provided for data exchanges between processors.

6 Claims, 6 Drawing Figures

UNIVERSAL ARRANGEMENT FOR THE EXCHANGE OF DATA BETWEEN THE MEMORIES AND THE PROCESSING DEVICES OF A COMPUTER

BACKGROUND OF THE INVENTION

The present invention relates to an arrangement which enables data to be exchanged between the memories and the processing devices of a computer.

Arrangements of this kind known at the present time are specific both as to the technology of the memories employed and as to the computer processing units which make use of the memories. Similarly, arrangements for exchanges between processors depend entirely on the processors.

At the present time, the technology used to produce central memory units for computers in evolving rapidly both from the point of view of performance and from the point of view of modes of operation.

The result is that whenever new technology appears on the market it is necessary, if it is desired to use the new technology, to modify all the logic elements which perform exchanges between the memory unit and the processors using the unit. In fact, corresponding to each new kind of technology which appears there is a new mode of operation and, in particular, different timing for the signals exchanged.

So that the invention may be better understood, it will be mentioned here that a processor is the part of the computer in which processing takes place and which contains the control elements and the elements for arithmetic and logic calculations. In small and medium size computers, the processor is represented by the processing section of the central unit. The central unit also includes the central memory and the connecting channels to the peripherals. In large systems, one or more processors are independent, as also are a number of central memory units and input/output controlling units.

Also, for obvious economic reasons, it is helpful to use the same memory unit for different processors. However, generally speaking, because of the differing modes of operation of processors, it is necessary to make extensive alterations to match up the interface elements each time a new processor is connected to a memory unit for which it was not originally intended.

SUMMARY OF THE INVENTION

The present invention has as an object to provide arrangements for a universal type of exchange between the processing unit or processor on the one hand and a memory unit on the other hand, or possibly between two processors. The invention thus provides a universal exchange interface. With the arrangement according to the invention it is possible, either independently or in combination:

(1) To link the initiating phase of a memory cycle request with a reading operation and reinitialization of the interface;

(2) To link the initiating phase of a memory cycle request with a writing operation and reinitialization of the interface; and (3) To link the initiating phase of a memory cycle request with a reading operation followed by a writing operation and reinitialization of the interface.

Another object of the invention is to enable a memory unit employing no matter what technology to be connected immediately, without the slightest modification, to a given processor. A similar object is to enable a given memory unit to be accepted with equal immediacy by a processor of any kind whatever.

Yet another object of the invention is to enable two processors of different types to be connected together immediately.

BRIEF DESCRIPTION OF THE DRAWINGS

The invention will be better understood from the following description, which is given with reference to the drawings, in which.

DETAILED DESCRIPTION OF THE PREFERRED EMBODIMENT

Figure 1:
FIG. 1 shows where the universal exchange interface is situated in a computer.

FIG. 1 shows where the invention is applied in a computer, the universal exchange interface being situated between a memory unit and the processor. The memory unit and the processor may use totally different technologies but, whatever the kinds of technology employed, the universal exchange interface allows the connections required between the memory and the processor to be established.

The arrangements employed in the context of the invention enable a dialogue exhibiting two kinds of asynchronism to be managed.

The actions performed by a processor on a memory unit can in fact always be reduced to three basic kinds:

(1) Initiation of a cycle in the memory unit;

(2) execution of a writing operation in the memory; and (3) execution of the operation of reading a memory location.

These operations may be performed over varying periods, depending upon the technology employed. These three kinds of operation may be linked together in a sequence and at a rate which depends both on the processor and on the kind of memory unit. The following principles can therefore be established:

(1) The initiation of a memory cycle is governed by two asynchronous dialogue signals, namely, a memory cycle request signal DC and a cycle acknowledge signal AC. The cycle request signal DC initiates the memory cycle, and the cycle acknowledge signal AC indicates after a certain period of time, which can vary in two ways, that the memory cycle has in fact started. The response time is variable because it is specific to the memory unit concerned and makes allowance for whether or not the memory unit is busy.

(2) The execution of a writing operation in the memory space is also synchronized by means of a pair of asynchronous signals, namely a write initiate signal TE and a writing finished signal AE. The write initiate signal TE, sent out by the processor, triggers the writing operation in the memory unit the moment it reaches the memory unit. The writing finished signal AE notifies the processor that the writing operation has been completed by the memory unit after a period of time dependent upon the particular technology employed.

(3) Finally, the execution of a reading operation by a memory unit is governed in a similar fashion by means of a pair of asynchronous signals, namely the data ready signal TL and the reading finished signal AL. The data ready signal TL signals the actual appearance at the interface of the data content of the addressed memory location. The reading finished signal AL is emitted by the processor when it has finished using the data read (for example by recording it or subjecting it to any other processing).

In all three cases, the "acknowledge" or "finished" signals cancel out the actuating signals (request, initiate or data ready) which produce them after a varying intrinsic response time. They are then themselves cancelled out by the trailing edges of the actuating signals.

Figure 2:
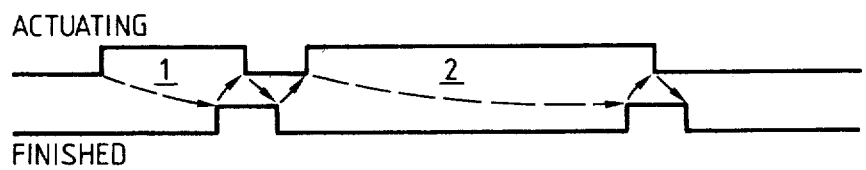
FIG. 2 shows generally the timing of the diaglogue signals.

FIG. 2 illustrates more specifically the kind of dialogue which is described above in general terms. The variable response time (time intervals 1 and 2) of the "finished" signal in relation to the leading edge of the "actuating" signal can be seen. Interval 1 is a purely intrinsic response time, while interval 2 represents an additional delay due to a "busy" phenomenon. It can therefore be seen that the various actions of the memory unit which are governed by the above pairs of signals are linked together independently of one another and in a manner which is likewise completely asynchronous.

Figure 3:
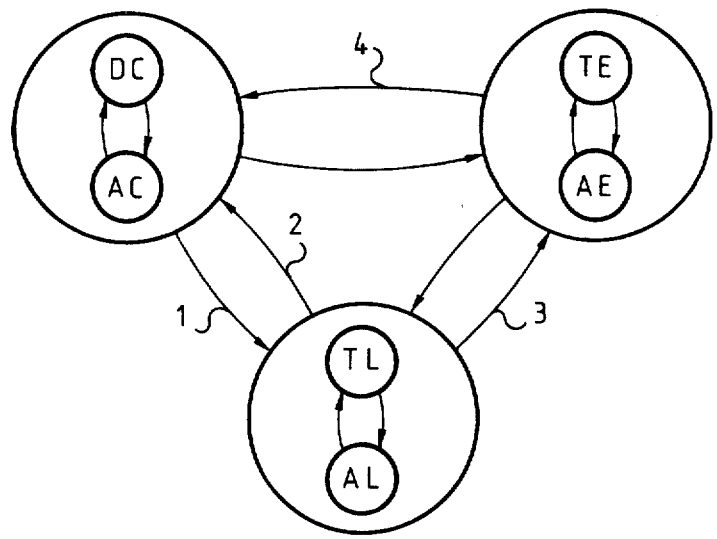
FIG. 3 shows, in diagrammatic form, the linking together of the signals which govern exchanges between processors and memory units.

FIG. 3 is a diagram showing the linking together of the signals which govern the exchanges between processors and memory units. Each actuation signal or finished or acknowledge signal is shown at a junction point which represents its appearance. Thus, the cycle request signal DC gives rise to its acknowledge signal AC which, in turn, authorizes a fresh cycle request signal DC. Furthermore, each individual dialogue comprising one pair of signals corresponds to one of the actions in the memory. Each dialogue is therefore shown circled to form a super-junction which is connected to another super-junction by oriented connections which represent the linking together of the actions. Thus, the initiation of a memory cycle results, with synchronization appropriate to the kind of memory being used, in a reading operation being performed (path 1), which may be followed either simply by the initiation of a fresh cycle (link 2), or again by a write operation (link 3) which in turn is followed by a new cycle being initiated (link 4).

All the combinations shown in the diagram of FIG. 3 are also possible with synchronizations which are variable but minimal for a given technology or use. The oriented connections in the diagram represent transitions of varying duration. As a whole, this arrangement allows the processor unequalled flexibility in making use of the memory unit. It will be noted that exchanges of this kind may also be carried over to dialogues between processors or even between processes.

The asynchronous control signals described above not only govern the actions in real time but also act as synchronization for the data signals which accompany them. Thus, the memory cycle request DC and cycle acknowledge AC pair are responsible for synchronizing the allocation signals. The allocation signals define what is to be done in the course of the cycle. For a memory unit, these allocation signals comprise an address and an instruction which define the type of memory cycle to be performed (reading, writing, or both). The number of binary digits making up the address of the instruction must be fairly large to cover all requirements. Similarly, the write initiate TE and writing finished AE pair provide synchronization for the binary data digits to be written. Finally, the data ready TL and reading finished AL pair provide synchronization for the status reporting signals which state how the cycle has run. In particular, alarm signals may be given following certain checks.

Figure 4:
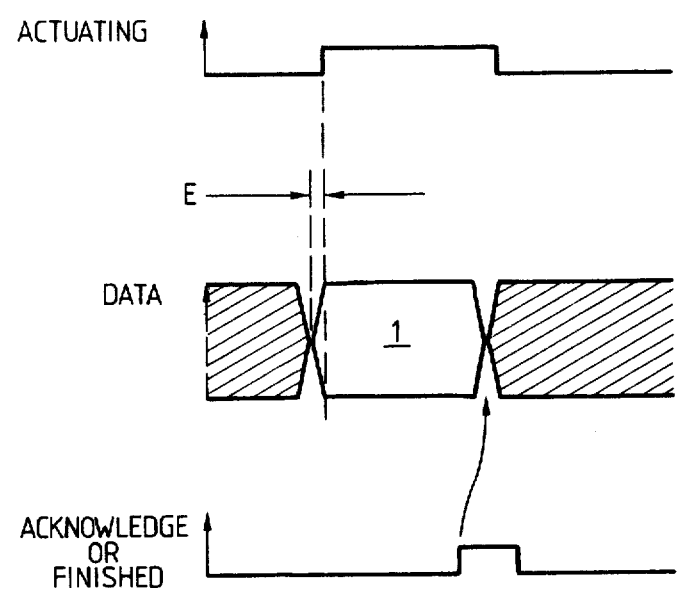
FIG. 4 is a diagram showing how the data signals are synchronized by the signals controlling the dialogue at the universal exchange interface.

As shown in FIG. 4, the synchronization rule which is adopted for the data signals in relation to the control signals is the following. Valid data should precede the leading edge of the actuating signal by as small an amount as desired at the time of transmission. Valid data should be maintained until the leading edge of the acknowledge or finished signal is received. In FIG. 4, reference numeral 1 marks the time interval during which the data is valid.

Figure 5A:
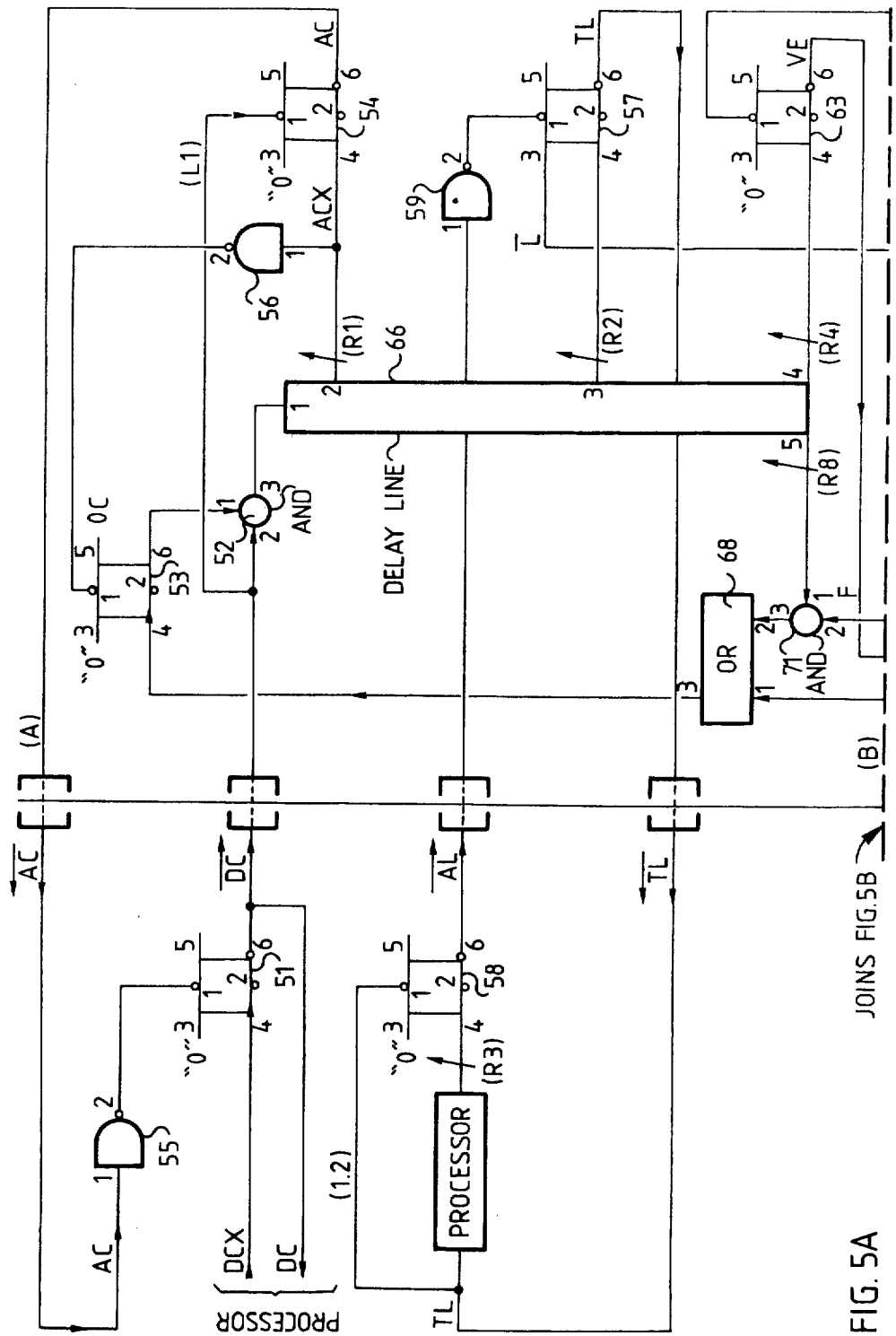
FIGS. 5A and 5B show an embodiment of universal exchange interface.
Figure 5B:
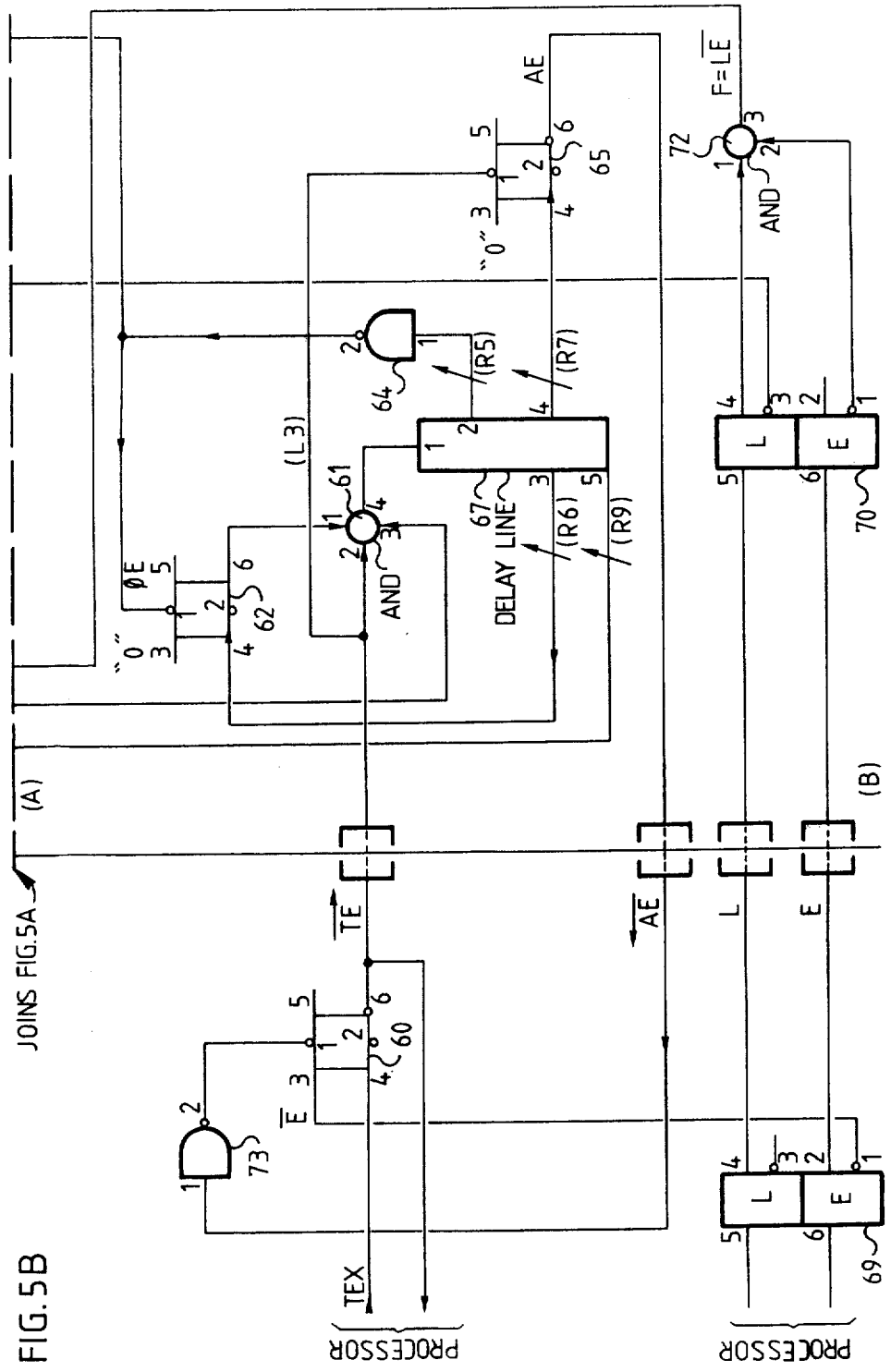

FIGS. 5A and 5B together show an embodiment of universal exchange interface when FIG. 5A is positioned above FIG. 5B. The arrangement shown in FIGS. 5A and 5B can readily be produced using discrete components such as flip-flops, memory devices, inverters, logic circuits which perform an AND function or an OR function, and delay lines. Such devices are familiar to those skilled in the art and may, for example, be those described in the "TTL Data Book for Design Engineers" published by Texas Instruments, Inc. In particular, a flip-flop may comprise a Type No. SN74S74 integrated circuit; an AND gate may comprise a Type No. SN74S08 integrated circuit (two input) or a Type No. SN74S11 integrated circuit (three input); an OR gate may comprise a Type No. SN74S32 integrated circuit; and an inverter may comprise a Type No. SN74S04 integrated circuit. Delay lines are likewise familiar to those skilled in the art. They generally comprise an assembly of circuits having localized constants in the form of inductances and capacitors. An electrical signal applied to an input of a delay line is retransmitted from one or more outputs of the line after one or more known and specified time intervals. It will be appreciated that a delay line is only a representative form of delay device, and that other elements, such as clocked shift registers having multiple output taps, may as well be employed as delay devices.

In FIGS. 5A and 5B, all the elements shown to the left of line AB are included within the processor, and all those to the right of the same line are included within the memory unit.

So that the invention may be better understood, it will be mentioned that a flip-flop is a device which is capable of assuming two stable operating states, one representing a binary "0" digit, in which case it is said that the flip-flop is "reset" or clear, and the other a binary "1" digit, when the flip-flop is said to be "set" or in the active state. These states appear in the form of a steady electrical potential or logic level at the normal or "Q" output of the flip-flop. Generally speaking, in the remainder of the description an electrical potential of zero level (low) represents a binary "0" digit and an electrical potential of other than zero level (high) represents a binary "1" digit, at which time the potential is said to be at the logic "1" level. In the arrangement shown in FIGS. 5A and 5B the electrical potentials can only be at the two levels "1" and "0."

The inputs for each of the flip-flops, such as 51, 53, 57, etc., are as follows. Input 1 of a flip-flop is used to preset it to the active state. Input 2 is used to clear it to zero or to the reset state. The preset and clear inputs 1 and 2 are active when low, that is, when at the logic "0" level. The outputs 5 and 6 are respectively and normal Q output of the flip-flop and the complementary output $\bar{Q}$. Input 3 of the flip-flop is the data input. Input 4 receives the clock signals which enable the item of data present at input 3 to be stored in the flip-flop.

The exchange of data between the processor and the memory takes place as follows. A memory cycle request DC is made by the processor by outputting a signal DCX which is applied to a "cycle request" flip-flop 51 clock input 4. This causes the flip-flop 51 to be reset to zero because the flip-flop 51 data input 3 is tied to logic "0," the consequence of which is that a logic "1" level signal appears at the $\bar{Q}$ output 6 of the flip-flop 51, which thus transmits a cycle request signal DC to the memory unit. This cycle request signal DC is also transmitted to input 2 of an AND gate 52. AND gate 52 only allows a cycle to be initiated by the cycle request signal DC when a "busy state" flip-flop 53 is reset and the $\bar{Q}$ output 6 of flip-flop 53 is thus at the logic "1" level, which is then transmitted to input 1 of AND gate 52. (Like all the flip-flops shown in the embodiment, the "busy state" flip-flop 53 is reset when initialized.) Output 3 of AND gate 52 is connected to input 1 of a delay line 66. This delay line 66 transmits the cycle request signal DC after a delay R1 which is adjusted to suit the technology of the memory unit concerned, this delayed version of signal DC being designated signal ACX.

The consequence of this is that a flip-flop 54 (with its data input 3 tied to logic "0")is clocked via its input 4 and thus emits from its Q output 6 the cycle acknowledge signal AC. This cycle acknowledge signal AC is then transmitted to the portion of the universal exchange interface included within the processor (to the left of line AB). The cycle acknowledge signal AC thus appears at the input 1 of an inverter 55, whose active low output 2 is connected to the preset input 1 of the cycle request flip-flop 51, and results in the cycle request DC made by flip-flop 51 being cancelled out. The end of the cycle request signal DC (when DC returns low) also causes the cycle acknowledge signal AC to go low via the connection L1 to the active low preset input 1 of flip-flop 54.

The signal ACX, which is in fact the cycle request signal DC delayed by the delay R1, is transmitted to the input 1 of an inverter 56 which transmits from its active low output 2 a signal to the preset input 1 of the "busy state" flip-flop 53. The "busy state" flip-flop 53 thus changes to its active state and prevents any new cycle request being made for the entire period when the busy signal is present, this being accomplished by the binary "0" state from the $\bar{Q}$ output 6 of flip-flop 53 applied to input 1 of AND gate 52. Nevertheless, as soon as it is notified of the end of the first cycle request, the processor can prepare a second request which causes the cycle request flip-flop 51 to be reset to zero as before and then remains waiting.

In the portion included within the processor (left of line AB), the universal exchange interface is provided with a storage register 69 comprising two flip-flops. The data contained in this register 69 is copied in the interface portion included within the memory unit (right of line AB) into a two flip-flop register 70. This copying is performed in accordance with the synchronizing rule illustrated by FIG. 4 using the "cycle request" DC and "cycle acknowledge" AC signals. The data contained in storage register 69 has previously been transmitted by the processor and it indicates that either a writing operation or a reading operation, or both, is to be performed in the course of the memory cycle triggered by the cycle request DC. Output 2 of storage register 69 is connected to input 6 of register 70 and transmits to the register 70 a write signal E. Output 4 of register 69 is connected to input 5 of register 70 and transmits to the register 70 a read signal L. When write signal E is at the logic "1" level, a writing operation is performed during the course of the memory cycle which is triggered by the cycle request DC. If the write signal E is at the logic "0" level, no writing operation is performed. Similarly, when read signal L is at the logic "1" level a writing operation is performed during the course of the memory cycle triggered by the cycle request DC. If the read signal L is at the logic "0" level no writing operation is performed.

Output 3 of register 70, which gives the complemented value $\bar{L}$ of read signal L, is connected to data input 3 of a flip-flop 57 for generating the data ready signal TL. If a reading operation is to be performed, output 4 of register 70 will have been set to the active state (binary "1" level) when the content of register 69 was transferred to register 70 during the allocation phase defined by the dialogue between the cycle request DC and cycle acknowledge AC signals. Then, in this case and in this case only, at the end of a period R2 which is adjusted to suit the technology employed, the data ready signal TL is set to its active state by a clock signal TLX at input 4 of flip-flop 57. This data ready signal TL is transmitted by Q output 6 of flip-flop 57 to the processor, which decides the time at which the data which has been read need no longer be held stable by generating the reading finished signal AL, after a set delay R3, via flip-flop 58. The delayed data ready signal TL arrives at input 4 of flip-flop 58, and reading finished signal AL appears at flip-flop 58 Q output 6. Reading finished signal AL is then transmitted to the input 1 of an inverter 59, whose output 2 is connected to preset input 1 of flip-flop 57, the effect of which is to cancel out the data ready signal TL from Q output 6 of flip-flop 57. When the data ready signal TL goes low, the reading finished signal AL is cancelled via a connection L2 which transmits signal TL to the active low preset input 1 of flip-flop 58.

The data ready TL and reading finished AL pair of control signals thus synchronize the data read.

The output 1 of storage register 69 which gives the complemented value $\bar{E}$ of write signal E is connected to data input 3 of a write initiate TE generating flip-flop 60. If a writing operation is to be performed ($\bar{E}$ low), the flip-flop 60 which identifies a writing operation is reset to the zero state when clocked at input 4 by the processor. Consequently, in this case when flip-flop 60 is in the zero or reset state, and only in this case, when the processor so decides, it initiates storage and the transmission of the write initiate signal TE by applying an actuating signal TEX to clock input 4 of flip-flop 60. Write initiate signal TE thus appears at $\bar{Q}$ output 6 of flip-flop 60 and is transmitted to the memory unit (right of line AB) to initiate the writing operation if the logic conditions set by AND circuit 61 are satisfied.

One of these conditions is that a "busy with writing" flip-flop 62 be in the inactive state, the consequence of which is that a logic "1" level is present at $\bar{Q}$ output 6 of this flip-flop 62, which is then applied to input 1 of AND gate 61. It is also necessary that a write gating flip-flop 63 should emit its write gating signal (VE), which is achieved by a delay R4 to provide a signal which appears at output 4 of delay line 66, the delay being specific to the technology employed. The signal emerging from output 4 of the delay line 66 is applied to the clock input 4 of flip-flop 63 (with its data input 3 tied to logic "0") and is retransmitted from $\overline{Q}$ output 6 of write gating flip-flop 63 as signal VE to input 3 of AND gate 61. The writing operation then takes place in the memory unit.

A control signal ($\phi$E) is then emitted after a delay R5, in the form of a signal from output 4 of AND gate 61, which is applied to input 1 of a delay line 67 and appears at the end of the delay R5 from output 2 of the delay line 67. This signal is applied to the input 1 of an inverter 64 and is retransmitted in inverted form from the inverter 64 output 2 to active low preset input 1 of the "busy with writing" flip-flop 62. This prevents any fresh write requests being accepted until a signal which is delayed by an amount R6 defined by the particular technology employed is emitted from output 3 of delay line 67. This signal is then transmitted to the clock input 4 of the "busy with writing" flip-flop 62, the result of which is to reset flip-flop 62 to zero, since its data input 3 is tied to logic level "0".

At the end of a delay R7 the signal which appears at output 4 of delay line 67 clocks a flip-flop 65 at its clock input 4 and causes the writing finished signal AE to be emitted from its $\overline{Q}$ output 6. The writing finished signal AE is transmitted to the processor to stop or cancel transmission of the write initiate signal TE by presetting flip-flop 60 via inverter 73, writing finished signal AE being applied to the input 1 of the inverter 73 and being retransmitted in inverted form from inverter 73 output 2 to active low preset input 1 of flip-flop 60. A connection L3 transmits the write initiate signal TE to active low preset input 1 of flip-flop 65, and the write initiate signal TE going to logic level "0" thus causes the writing finished signal AE to end by going to logic level "0" due to the presetting of the flip-flop 65.

The write initiate TE and writing finished AE pair of control signals thus synchronize the data to be written.

The signal which emerges from output 5 of the delay line 67, which is subject to a delay R9 selected to suit the technology, is transmitted via an OR gate 68 to the clock input 4 of flip-flop 53, which states whether the cycle is busy or not. Since the data input 3 of flip-flop 53 is tied to logic "0," the effect of this is to reset flip-flop 53 to the inactive state. This reinitializes the universal exchange interface such that a new cycle request DC can be accepted, thus authorizing the entire process to be performed again.

In the same way, at the end of a reading operation, a signal subject to a delay R8 which is set to suit the technology, appears at output 5 of delay line 66. This signal is gated by means of an AND gate 71 by the following logic function: READ·$\overline{\text{WRITE}}$ or $F = L\overline{E}$. This latter logic funcion is performed by an AND gate 72 connected to outputs 4 and 1 of the memory register 70. Thus, when the memory cycle request is for a reading operation not accompanied by a writing operation, in which case the above function F is operative, a signal appears at output 3 of AND gate 71 after the delay R8 and, via the OR gate 68, is transmitted to the clock input 4 of flip-flop 53 for reinitialization.

When storage register 69 and, thus, register 70 contain a read request L and a write request E at the same time, that is to say when flip-flops L and E of the registers 69 and 70 are both in the active state, the operations are linked together as follows. A reading operation takes place as described above. Reinitialization does not take place after the reading operation because $\overline{E}$ is low and the function $F = L\overline{E}$ which gates the AND gate 71 is not operative. Then, at a time which it selects, the processor initiates a writing operation following the procedure already described. At the completion of the writing operation, after the delay R9, the reinitializing process is initiated as indicated above.

The example which has just been given of a preferred embodiment of the invention is in no way limiting and it will be appreciated that any person skilled in the art of computer techniques could design other embodiments of the invention without thereby departing from its scope.

What is claimed is:

1. An interface for controlling the exchange of data between a memory unit and at least one processing unit of a computer wherein the operations performed by the processing unit on the memory unit are performed over a time varying period and include the initiation of a memory cycle determined by a memory cycle request signal (DC) and a cycle acknowledge signal (AC), the execution of a write operation determined by a write initiate signal (TE) and a write finish signal (AE) and the execution of a read operation determined by a data ready signal (TL) and a reading finished signal (AL) comprising:

a delay device (66, 67) having a plurality of delay outputs and having an input connected to receive the memory cycle request signal (DC) emitted by the processing unit and being operable to transmit said signal (DC) after a first delay (Ri) to the processing unit, said delayed cycle request signal establishing the cycle acknowledge signal (AC) for indicating that a memory cycle has been initiated.

a first storage means (70) in the memory unit, a second storage means (69) in the processing unit, said second storage means adapted to store information indicating that either the write or the read operation, or both, are to be performed, means connecting the output of the second storage means to the input of the first storage means to transfer the information to the first storage means, said transfer being effected during an interval of time defined by the cycle request signal (DC) and the cycle acknowledge signal (AC).

first means for linking the memory cycle request initiated by the processing unit with a read operation in the memory unit requested by said processing unit in response to the data ready signal TL and the reading finished signal (AL), said data ready signal being obtained from an output of said delay device (66,67) after an adjustable delay (R2) determined by said delay device (66,67) and transmitted to said processing unit for execution of the read operation, the reading finished signal (AL) being outputted by the processing unit after receipt of the data ready signal (TL) and an adjustable delay (R3) determined by the processing unit, and second means for linking the memory cycle request initiated by the processing unit with a write operation in the memory unit requested by said processing unit in response to the write initiate signal (TE) and the write finish signal (AE), said write initiate signal being initiated by the processing unit and transmitted to the memory unit after an adjustable delay (R4) by said delay device (66,67), said write finish signal (AE) being obtained from an output of delay device (66,67) after an adjustable delay (R7) determined by said delay device whereby the exchange of data may be controlled between processing units and memory units having different timing for the signals exchanged.

2. An interface according to claim 1, wherein said data ready signal (TL) and said reading finished signal (AL) synchronize the data read in the memory unit during a reading operation requested by the processing unit.

3. An interface according to claim 1, wherein said write initiating signal (TE) and said writing finished signal (AE) synchronize the data to be written in the memory unit during a writing operation requested by the processing unit.

4. An interface according to claim 1, wherein said delay device (66,67) includes a reinitializing signal output, said signal ouput being transmitted at the end of a reading operation to a cycle reinitializing means (53) in said memory unit after an adjustable delay (R8).

5. An interface according to claim 1, wherein said delay device (66,67) includes a reinitializing signal output, said signal output being transmitted at the end of a writing operation to a cycle reinitializing means (53) in said memory unit after an adjustable delay (R9).

6. An interface according to claim 4, wherein said interface comprises means (71,72) connected to said first storage means (70) for inhibiting said reinitializing signal at the end of a reading operation and for initializing a writing operation to perform a reading operation followed by a writing operation.

* * * * *

UNITED STATES PATENT AND TRADEMARK OFFICE
CERTIFICATE OF CORRECTION

PATENT NO. : 4,330,824
DATED : May 18, 1982
INVENTOR(S) : Paul M. Girard

It is certified that error appears in the above-identified patent and that said Letters Patent are hereby corrected as shown below:

Claim 1, column 8, line 34, delete "Ri" and substitute --RI--.

Signed and Sealed this

Twentieth Day of July 1982

[SEAL]

Attest:

GERALD J. MOSSINGHOFF

Attesting Officer   Commissioner of Patents and Trademarks